United States Patent
Yamazaki et al.

(10) Patent No.: US 10,802,589 B2
(45) Date of Patent: Oct. 13, 2020

(54) METHOD AND APPARATUS FOR DRIVING ACTUATORS

(71) Applicant: LENOVO (SINGAPORE) PTE. LTD., Singapore (SG)

(72) Inventors: Mitsuhiro Yamazaki, Kanagawa-ken (JP); Kenji Yanai, Kanagawa-ken (JP); Fusanobu Nakamura, Kanagawa-ken (JP); Yasushi Tsukamoto, Kanagawa-ken (JP)

(73) Assignee: LENOVO (SINGAPORE) PTE LTD (SG)

( * ) Notice: Subject to any disclaimer, the term of this patent is extended or adjusted under 35 U.S.C. 154(b) by 678 days.

(21) Appl. No.: 15/605,752

(22) Filed: May 25, 2017

(65) Prior Publication Data
US 2017/0344117 A1 Nov. 30, 2017

(30) Foreign Application Priority Data
May 25, 2016 (JP) ................................. 2016-104339

(51) Int. Cl.
*G06F 3/01* (2006.01)
*C22F 1/00* (2006.01)
(Continued)

(52) U.S. Cl.
CPC .............. *G06F 3/016* (2013.01); *C22F 1/006* (2013.01); *G06F 3/0202* (2013.01); *G06F 3/023* (2013.01)

(58) Field of Classification Search
None
See application file for complete search history.

(56) References Cited

U.S. PATENT DOCUMENTS

| 10,191,550 B1* | 1/2019 | Nussbaum | G06F 3/016 |
| 2011/0050148 A1* | 3/2011 | Gao | H01L 41/1132 |
| | | | 318/646 |

(Continued)

FOREIGN PATENT DOCUMENTS

| JP | 2008262478 A | 10/2008 |
| JP | 2011-096133 A | 5/2011 |

(Continued)

OTHER PUBLICATIONS

Hiroshi Suzuki, "Fundamentals of digital communication" Electronic Communication Engineering EKR-10, Printed in Japan, Mathematics engineering company, Jan. 25, 2012.

*Primary Examiner* — Munear T Akki
(74) *Attorney, Agent, or Firm* — Russell Ng PLLC; Antony P. Ng

(57) ABSTRACT

A method of driving an actuator using a shape memory alloy is provided. An impact-driven actuator is activated by a pulse voltage generated by an action of a transistor. A keyboard outputs a key event at the timing of an input operation. A stress monitoring unit calculates a stress amount of an impact-driven actuator based on parameters of a key event and a pulse voltage. A stress adjustment unit changes the parameter of the pulse voltage when the stress amount reaches a permissible value. The parameter may be a wave crest value or a pulse width of the pulse voltage. The stress adjustment section is also able to stop the action of the impact-driven actuator in response to a key event corresponding to a break code.

14 Claims, 7 Drawing Sheets

(51) Int. Cl.
    *G06F 3/023*     (2006.01)
    *G06F 3/02*     (2006.01)

(56) References Cited

U.S. PATENT DOCUMENTS

| | | | |
|---|---|---|---|
| 2016/0041227 A1* | 2/2016 | Mao | G01R 31/3271 324/415 |
| 2017/0168578 A1* | 6/2017 | Tsukamoto | G06F 3/02 |
| 2017/0255277 A1* | 9/2017 | Morrison | G06F 3/0219 |

FOREIGN PATENT DOCUMENTS

| | | |
|---|---|---|
| JP | 4821911 B2 | 11/2011 |
| JP | 2015-055955 A | 3/2015 |
| JP | 2016015698 A | 1/2016 |
| JP | 2016-053778 A | 4/2016 |

\* cited by examiner

METHOD AND APPARATUS FOR DRIVING ACTUATORS

PRIORITY CLAIM

The present application claims benefit of priority under 35 U.S.C. §§ 120, 365 to the previously filed Japanese Patent Application No. JP2016-104339 with a priority date of May 25, 2016, which is incorporated by reference herein.

TECHNICAL FIELD

The present invention relates to actuators in general, and in particular to a method and apparatus for driving an actuator using a shape memory alloy.

BACKGROUND

In some cases, an actuator having a haptic feedback to provide a user with a tactile sensation is incorporated into a touch screen of a tablet terminal, a flat-type keyboard without key traveling, a touch-type operation switch without a keystroke or the like. Conventionally, an electromagnet, a piezoelectric element, a vibration motor or the like has been used as a driving part of an actuator. However, in recent years, a shape memory alloy (SMA), which has better performances in vibration intensity, response, and size, has become the more popular choice.

In an impact-driven actuator using shape memory alloy, it is possible to adjust the intensity of vibration applied to the vibrator with the wave crest value and the pulse width of the ingle pulse voltage applied to the SMA. The impact-driven actuator receives thermal and mechanical stresses and deteriorates every time repeating an action. Particularly, if stresses are concentrated in a short time, the impact-driven actuator is damaged or the lifetime thereof is decreased. Therefore, the number of actions per hour is limited.

For example, an impact-driven actuator used for a haptic feedback for a keyboard acts at the timing when an arbitrary key event occurs. When a fast-typing user performs an input operation, the repetition frequency of the single pulse voltage sometimes exceeds the upper limit. In this case, to protect the impact-driven actuator, it is necessary to skip a key event during the action or to stop the action for a certain period of time, inconveniently.

Consequently, it would be preferable to provide an improved method and apparatus for driving actuators.

SUMMARY

In accordance with an embodiment of the present disclosure, a predetermined pulse voltage is applied to an actuator in response to an input event. The stress amount of the actuator that acts in response to the input event is monitored, and an adjusted pulse voltage whose parameter can be adjusted is applied to the actuator in response to the input event when the stress amount reaches a predetermined value.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

I. Terminology

Figure 1A:
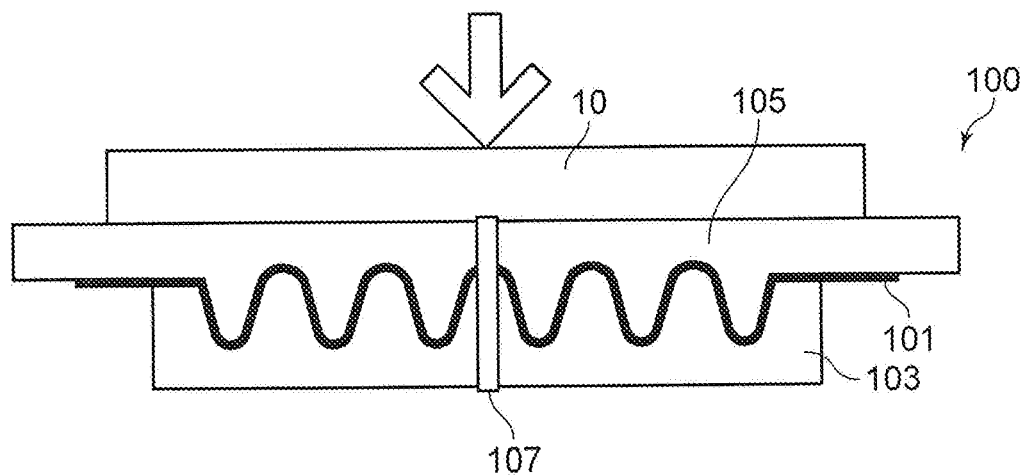
FIGS. 1A-1B are diagrams showing the structures of an impact-driven actuator.

Special terms used in the present specification will be described. An actuator using shape memory alloy (SMA) acts in a hysteresis cycle (a thermal cycle) between a martensitic phase (a low temperature phase) and an austenitic phase. The actuator performs a regular motion in itself to provide a vibration to a vibrator. The actuator using SMA includes an impact-driven actuator and a vibration-type actuator.

The impact-driven actuator is able to generate aimed vibration with one single pulse voltage or one thermal cycle. The vibration-type actuator generates the aimed vibration with a plurality of single pulse voltages repeatedly applied at predetermined intervals enabling the thermal cycle. Although a driving system according to the present invention is applicable to both types of actuators, the description will be made by giving an example of the impact-driven actuator in the present specification.

A single pulse voltage, which is a voltage present only for a short predetermined energizing time, supplies heat, which is required for driving an actuator, to SMA. The single pulse voltage acts as an electric current for the contraction of SMA, and therefore it is possible to restate the single pulse voltage as "single pulse current." Each of the voltage waveform and the current waveform during energizing time may be an arbitrary waveform such as that of a rectangular wave, a differential wave, a triangular wave, or a staircase wave whose wave crest value varies stepwise. The single pulse voltage includes a normal single pulse voltage and a pseudo single pulse voltage.

The normal single pulse voltage means a single pulse voltage not intermittent during energizing time. A pseudo single pulse voltage corresponds to a voltage generated by performing switching control of one normal single pulse voltage during the energizing time. Energy given to the impact-driven actuator by one normal single pulse voltage varies according to the wave crest value and the pulse width. The wave crest value and the pulse width are each referred to as parameters of a normal single pulse voltage.

Parameters of the pseudo single pulse voltage include a wave crest value, a duty ratio, and an energizing time of the sub-pulse voltage 34 (FIG. 4). Energy given to the impact-driven actuator by one pseudo single pulse voltage is able to be controlled by a duty ratio characteristically. In the case where it is unnecessary to distinguish the normal single pulse voltage from the pseudo single pulse voltage, each of them will be simply referred to as single pulse voltage in the following.

The vibrator corresponds to an object which provides required vibration at one single pulse voltage applied to the impact-driven actuator. Although the vibrator does not need to be particularly limited, the vibrator may be an object such as, for example, a touch panel, a keyboard, or a switch which gives a haptic feedback to a finger touching it when a human performs an operation. The impact-driven actuator receives thermal and mechanical stresses during operations.

A stress means a measurable physical quantity which accelerates the deterioration of the impact-driven actuator. The stress amount means a total of stresses received by the impact-driven actuator per unit time. A permissible stress amount means a stress amount permitted by the impact-driven actuator to secure a predetermined lifetime. The stress amount is identifiable by an energy amount or an amount used in place thereof per unit time supplied to the impact-driven actuator, for example.

In another example, the stress amount is identifiable by an energy amount or an amount used in place thereof received by the vibrator from the impact-driven actuator. The stress amount corresponding to the supplied energy amount is identifiable by parameter values of single pulse voltages and the number of single pulse voltages applied per unit time. Among the single pulse voltages, a normal single pulse voltage having a parameter value for the impact-driven actuator to generate a stress used as a reference of the lifetime is referred to as reference pulse voltage.

The permissible stress amount for the reference pulse voltage is identifiable by the number of reference pulse voltages applied per unit time. A single pulse voltage which gives stress smaller than that of the reference pulse voltage is referred to as adjusted pulse voltage. The adjusted pulse voltage includes a pseudo single pulse voltage. If the adjusted pulse voltage is a normal single pulse voltage, the wave crest value and the pulse width or any one thereof is smaller than those or that of the reference pulse voltage. If the adjusted pulse voltage is a pseudo single pulse voltage, the average value or wave crest value of the pseudo single pulse voltage is smaller than that of the reference pulse voltage, as compared with the case where the reference pulse voltage is the normal single pulse voltage. The adjusted pulse voltage provides low stress and therefore a larger number of adjusted pulse voltages than the number of reference pulse voltages can be applied within a range of permissible stress amounts.

Figure 1B:
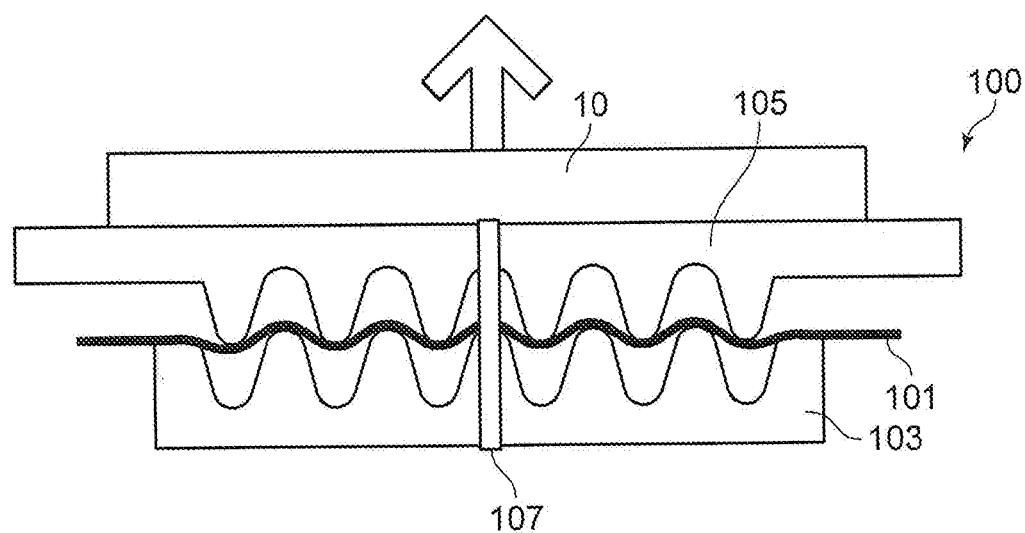

FIGS. 1A-1B are diagrams describing the structure of the impact-driven actuator 100. The impact-driven actuator 100 includes a stator 103, a mover 105, SMA 101, and a bias material 107. The impact-driven actuator 100 provides an impulsive or transient vibration to the vibrator 10. The SMA 101 repeatedly acts by means of one-way shape memory and a bias force. Note that, however, the present invention is also applicable to SMA which conducts two-way shape memory.

Facing surfaces of the stator 103 and the mover 105 facing each other are formed in a wavelike fashion so that their concave-convex surfaces fit together. Linear SMA 101 is arranged between the facing surfaces. For the SMA 101, nickel-titanium alloy, titanium-nickel-copper alloy, or the like may be selected, for example, but it does not need to be particularly limited. The bias material 107 may be formed by an elastic body which applies a bias force in a direction where the stator 103 and the mover 105 come close to each other.

FIG. 1A illustrates a state in which the SMA 101 reaches a temperature equal to or lower than a martensitic transformation finish temperature Mf (FIG. 2) and shows a flexible property. The mover 105 comes close to the stator 103 by means of the bias force which the bias material 107 applied to the mover 105, by which their facing surfaces fit together. The SMA 101 plastically deformed between the facing surfaces extends up to the maximum length along the shapes of the facing surfaces of the stator 103 and the mover 105. The state in which the SMA 101 is plastically deformed by the facing surfaces and the bias material 107 and has the maximum length is referred to as perfectly extended state.

FIG. 1B illustrates a state in which the SMA 101 contracts and cures accompanying a temperature rise and the temperature of the SMA 101 exceeds the austenitic transformation finish temperature Af (FIG. 2), by which the shape of the SMA 101 returns to the memorized shape. The state in which the contraction of the SMA 101 is finished is referred to as perfectly contracted state. The mover 105, which has received a force from the SMA 101 during a transition from the perfectly extended state to the perfectly contracted state, is displaced so that the distance from the stator 103 increases against the bias force. When a reference pulse voltage is applied to the impact-driven actuator 100, the SMA 101 undergoes a phase transition from the perfectly extended state to the perfectly contracted state with one thermal cycle. Furthermore, the SMA 101 returns to the perfectly extended state when the energizing time ends.

Figure 2:
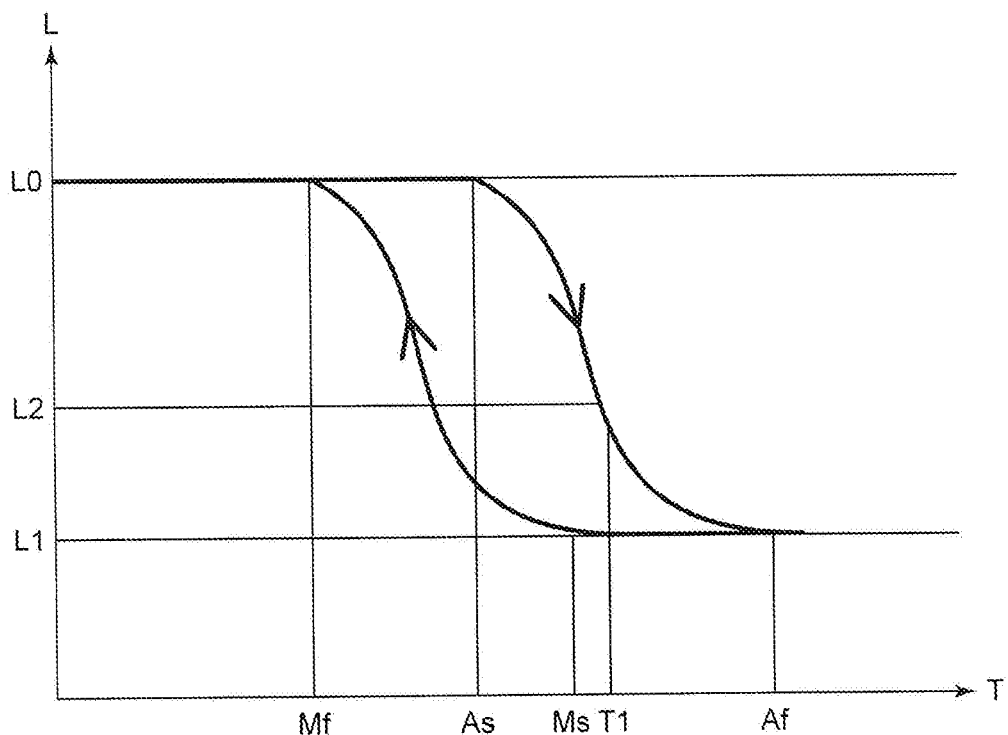
FIG. 2 is a graph describing a state in which the temperature and length of a shape memory alloy (SMA) change according to a thermal cycle.

FIG. 2 is a diagram describing a state of changes in the temperature and length of the SMA 101 to which a single pulse voltage is applied. The horizontal axis represents a temperature T of the SMA 101 and the vertical axis represents a length L. When the temperature of the SMA 101 is equal to or lower than the martensitic transformation finish temperature Mf, the SMA 101 wholly undergoes a phase transition substantially to a martensitic phase. In the martensitic phase, the SMA 101 has flexibility and therefore is plastically deformed by receiving a bias force.

If a voltage is applied to the SMA 101, which undergoes the phase transition to the martensitic phase, for electrical heating, a reverse martensitic transformation starts when the temperature of the SMA 101 exceeds the austenitic transformation start temperature As and the SMA 101 starts to contract. Furthermore, when its temperature has reached the austenitic transformation finish temperature Af, the contraction ends and the SMA 101 returns to the perfectly contracted state of the length L1 (L1<L0). A process in which the temperature rises from the austenitic transformation start temperature As to the austenitic transformation finish temperature Af will be referred to as complete temperature rising process.

If energization is stopped in the perfectly contracted state, the temperature decreases due to heat dissipation and a martensitic transformation starts at the martensitic transformation start temperature Ms, by which the SMA 101 gradually softens. During this period of time, the SMA 101 gradually extends according to the degree of softening and the bias force. Then, when the temperature has reached the martensitic transformation finish temperature Mf, the extension ends and the SMA 101 comes into the perfectly extended state of the length L0. The process in which the temperature decreases from the martensitic transformation start temperature Ms to the martensitic transformation finish temperature Mf will be referred to as complete temperature falling process.

The SMA 101 extends or contracts in length by d (L0−L1=d) during a complete thermal cycle composed of a one-time complete temperature rising process and a one-time complete temperature falling process. The mover 105 releases the bending stress, which has been applied to the vibrator 10 in the perfectly contracted state, in the perfectly extended state. The vibrator 10 vibrates in response to a rapid change in the stress given by the SMA 101 which extends or contracts by the application of the single pulse voltage. The vibration intensity changes according to the displacement amount and displacement velocity of the mover 105.

The displacement amount of the mover 105 depends on the contraction amount of the SMA 101 wherein the length L1 is the maximum value, in other words, the amount of supplied heat thereof. For example, even in the case of using a pulse voltage having the same wave crest value, if the energizing time ends at a temperature TI before reaching the austenitic transformation finish temperature Af due to a narrow pulse width, the SMA 101 contracts only up to the length L2 (L2>L1) and therefore the displacement amount of the mover 105 is less than that of the complete temperature rising process. Therefore, the displacement of the vibrator 10 is small and the acceleration decreases.

The temperature rising process with a single pulse voltage wherein the energizing time ends before reaching the austenitic transformation finish temperature Af will be referred to as incomplete temperature rising process. In the incomplete thermal cycle including the incomplete temperature rising process, the amount of supplied heat to the SMA 101 decreases in comparison with the complete thermal cycle and the displacement amount also decreases and therefore the stress is reduced. In addition, even in the case of the same energizing time, the greater the wave crest value is, the shorter the time for contraction up to the length L1 is, and therefore the displacement velocity of the mover 105 increases. Accordingly, a smaller wave crest value reduces the stress on the SMA 101.

Figure 3:
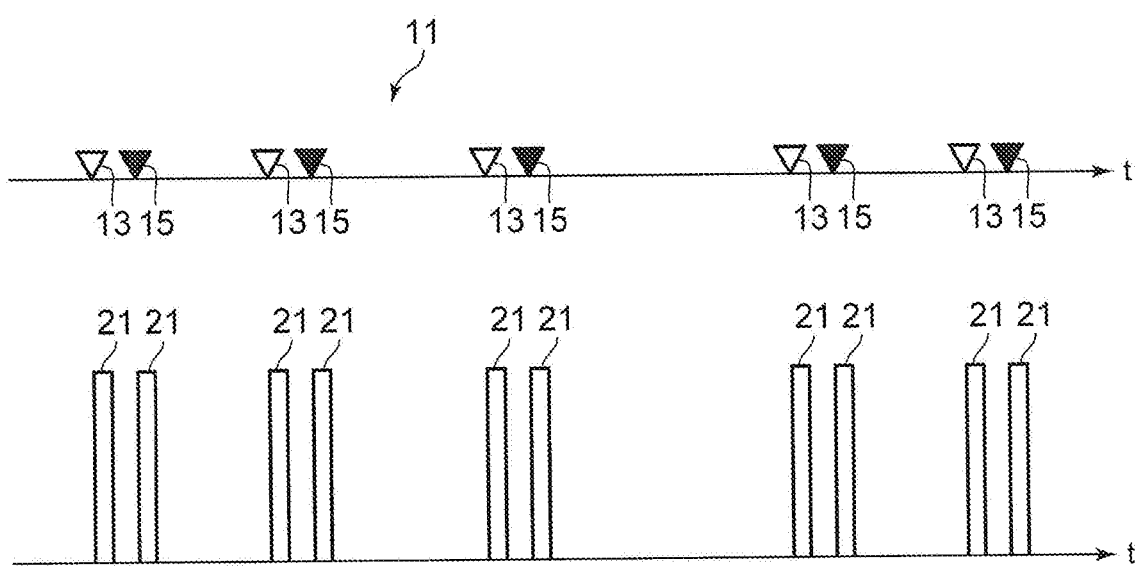
FIG. 3 is a diagram describing a state of a conventional action of the impact-driven actuator used for a haptic feedback for a keyboard.

FIG. 3 is a diagram describing a state of a conventional action of the impact-driven actuator 100 used for a haptic feedback for a keyboard. The key event 11 is generated at the timing of a make code 13 generated according to a transition to the ON state of a key switch and at the timing of a break code 15 generated according to a transition to the OFF state when the corresponding key is input on the keyboard. In response to the generation of the make code 13 and the break code 15, a reference pulse voltage 21 having a constant wave crest value and a constant pulse width is applied to the impact-driven actuator 100.

The stress given by one reference pulse voltage 21 to the impact-driven actuator 100 is constant. The stress amount in the case of applying only the reference pulse voltage 21 varies according to a user's typing speed. If the application of the reference pulse voltage 21 corresponding to an arbitrary key event 11 is skipped when the typing speed increases or the action is stopped only for a predetermined period of time in order to limit the stress amount during typing to the range of the permissible stress amount, the convenience deteriorates.

Figure 4A:
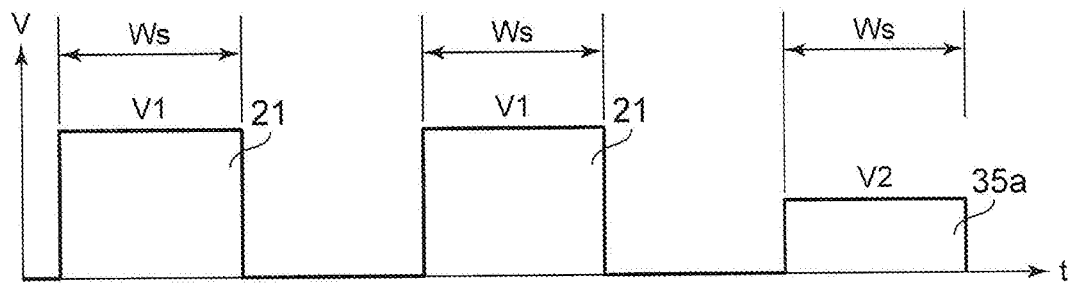
FIGS. 4A-4D are diagrams describing an example of an adjusted pulse voltage applied to the impact-driven actuator.
Figure 4B:
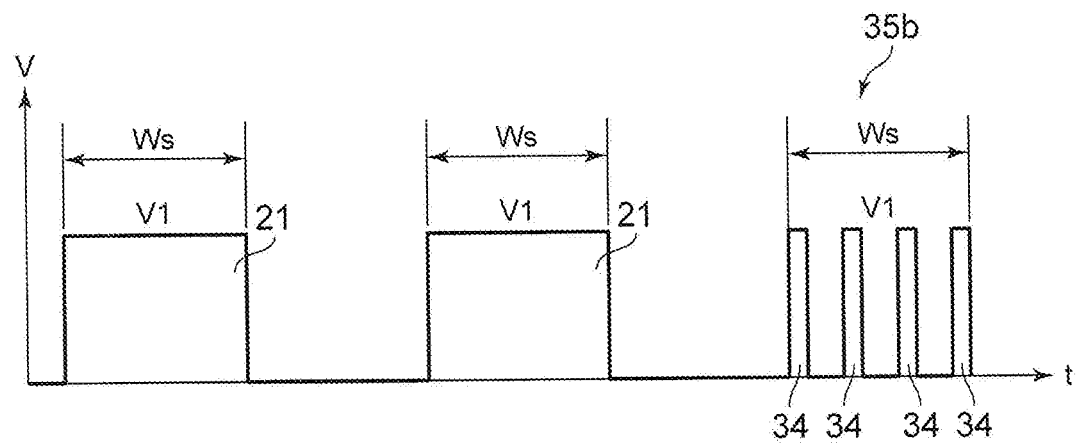

FIGS. 4A-4D are diagrams describing an example of an adjusted pulse voltage applied to the impact-driven actuator 100. FIG. 4A illustrates an adjusted pulse voltage 35a having a pulse width Ws and a wave crest value V2 (V2<V1) which has been generated following the reference pulse voltage 21 having a pulse width Ws and a wave crest value V1. FIG. 4B illustrates an adjusted pulse voltage 35b formed of a pseudo single pulse voltage which has been generated following the reference pulse voltage 21. The adjusted pulse voltage 35b includes a plurality of sub-pulse voltages 34 each having a wave crest value V1 and energizing time Wx.

The wave crest value V1 and the energizing time Wx of the adjusted pulse voltage 35b may be either the same as or different from those of the reference pulse voltage 21. The sub-pulse voltage 34 is able to be generated by performing the PWM control of a normal single pulse voltage. The sub-pulse voltage 34 may be generated by performing the PFM control with a constant on-period or a constant off-period, instead of the PWM control. In either case of the sub-pulse voltage, the off-period is shorter than the period of time of the complete temperature falling process required for achieving the complete thermal cycle and is selected so that the temperature of the SMA 101 does not fall down to the martensitic transformation finish temperature Mf in the temperature rising process.

If the adjusted pulse voltage 35b is applied to the SMA 101, its temperature rises and the SMA 101 contracts in the on-period of the sub-pulse voltage 34 and the contraction stops in the off-period. If the off-period is made short to a degree that a temperature decrease almost does not occur, in other words, to a degree that the SMA 101 does not almost extend, the length of the SMA 101 does not almost change during the off-period. The adjusted pulse voltage 35b acts on the SMA 101 equivalently to the adjusted pulse voltage 35a with the wave crest value lowered so as to reduce the stress on the SMA 101.

Figure 4C:
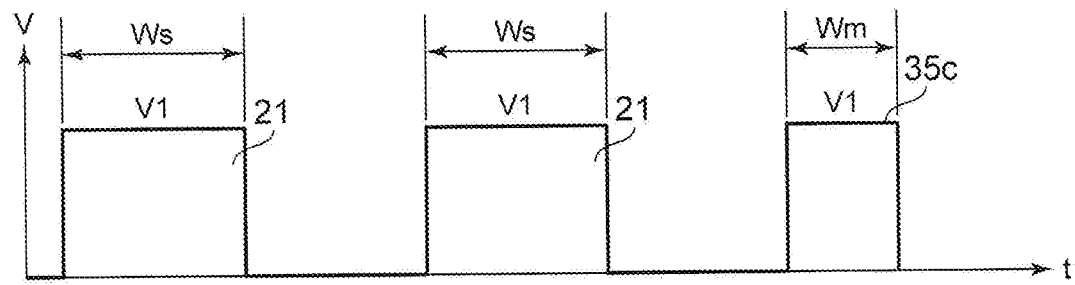
Figure 4D:
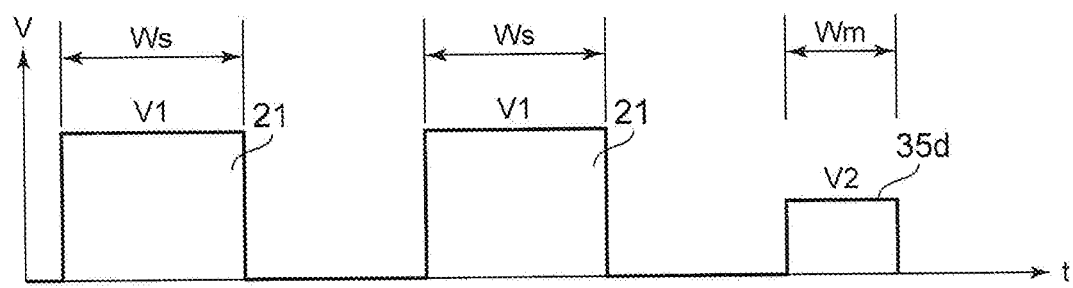

A pseudo single pulse voltage including a sub-pulse voltage 34 with a duty ratio of 100% corresponds to a normal single pulse voltage. FIG. 4C illustrates an adjusted pulse voltage 35c having a wave crest value V1 and a pulse width Wm (Wm<Ws) which has been generated following the reference pulse voltage 21, and FIG. 4D illustrates an adjusted pulse voltage 35d having a wave crest value V2 (V2<V1) and a pulse width Wm.

Figure 5A:
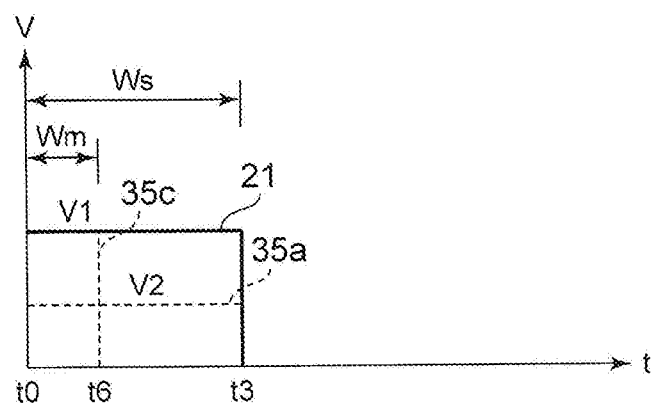
FIGS. 5A-5C are diagrams describing a state in which the stress on the impact-driven actuator is reduced when adjusted pulse voltages are applied.
Figure 5B:
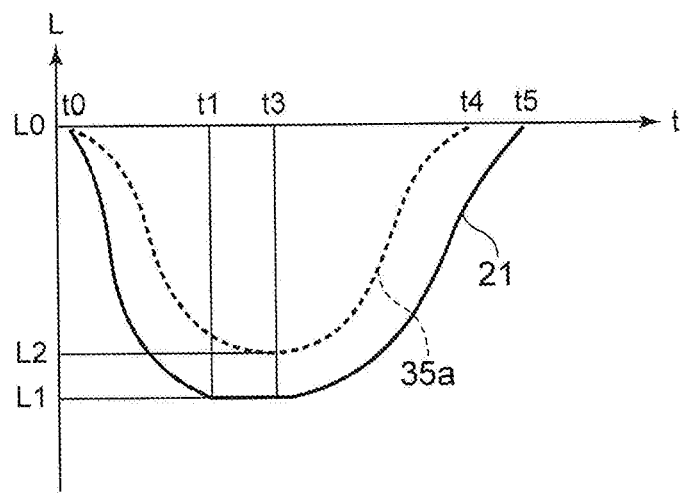
Figure 5C:
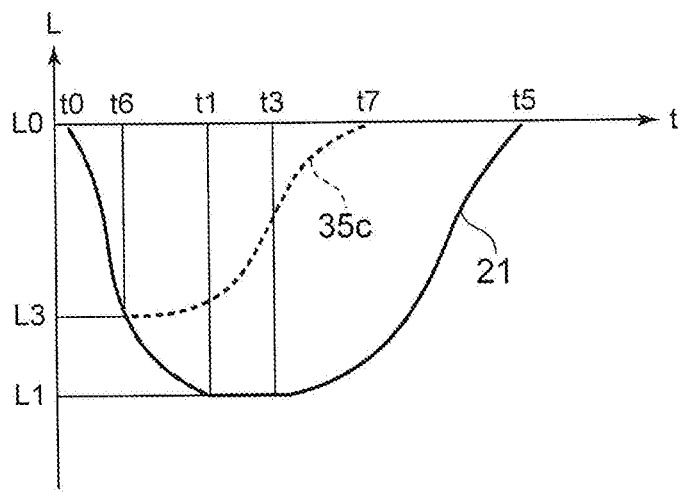

FIGS. 5A-5C are diagrams describing a state in which the stress on the impact-driven actuator 100 is reduced when the adjusted pulse voltages 35a to 35d are applied. FIG. 5A illustrates the wave crest values V1 and V2 and the pulse widths Ws and Wm of the reference pulse voltage 21 and the adjusted pulse voltages 35a and 35c, respectively. FIG. 5B illustrates a state in which the adjusted pulse voltage 35a is applied. FIG. 5C illustrates a state in which the adjusted pulse voltage 35c is applied.

In FIG. 5B, the behavior of the SMA 101 is compared between a case of applying the reference pulse voltage 21 and a case of applying the adjusted pulse voltage 35a. Although the adjusted pulse voltage 35a has a pulse width Ws equal to that of the reference pulse voltage 21, the wave crest value V2 of the adjusted pulse voltage 35a is smaller than that of the reference pulse voltage 21. When the reference pulse voltage 21 is applied to the SMA 101 having a length L0 at time t0, the complete temperature rising process ends at time t1 and the SMA 101 contracts up to the length L1. The SMA 101 maintains the length L until the end of the energizing time of the reference pulse voltage 21 and then starts the complete temperature falling process after time t3 when the energizing time ends. The SMA 101 resumes the length L0 at time t5 when the complete temperature falling process ends.

When the adjusted pulse voltage 35a is applied at time t0, the energizing time ends at time t3 before the end of the complete phase transition to the austenitic phase due to low Joule heat and the SMA 101 contracts only to the length L2 (L2>L1) at that time. The SMA 101 starts the incomplete temperature falling process after time t3 when the energizing time ends and then the incomplete temperature falling process ends at time t4, thereby the length returns to L0. The displacement amount of the SMA 101 is small and a period of time until the contraction stops is long when the adjusted pulse voltage 35*a* is applied in comparison with the case where the reference pulse voltage 21 is applied, and therefore the stress on the impact-driven actuator 100 is reduced. The same applies to the case where the adjusted pulse voltage 35*b* is applied.

In FIG. 5C, the behavior of the SMA 101 is compared between the case where the reference pulse voltage 21 is applied and the case where the adjusted pulse voltage 35*c* is applied. Although having a pulse width Wm shorter than that of the reference pulse voltage 21, the adjusted pulse voltage 35*c* has a wave crest value V1 equal to that of the reference pulse voltage 21 and therefore fluctuates equivalently during the temperature rising process from time t0 to time t6 when the energizing time ends. Although the incomplete temperature rising process ends at time t6, the SMA 101 contracts only up to the length L3 (L3>L1).

Thereafter, the incomplete temperature falling process starts and the length returns to L0 at time t7. The displacement amount of the SMA 101 is small when the adjusted pulse voltage 35*c* is applied in comparison with the case where the reference pulse voltage 21 is applied, and therefore the stress on the impact-driven actuator 100 is reduced. If the adjusted pulse voltage 35*d* is applied with the wave crest value V2 lowered as well as with the pulse width Wm lowered, the stress is able to be further reduced.

II. Driving System

Figure 6:
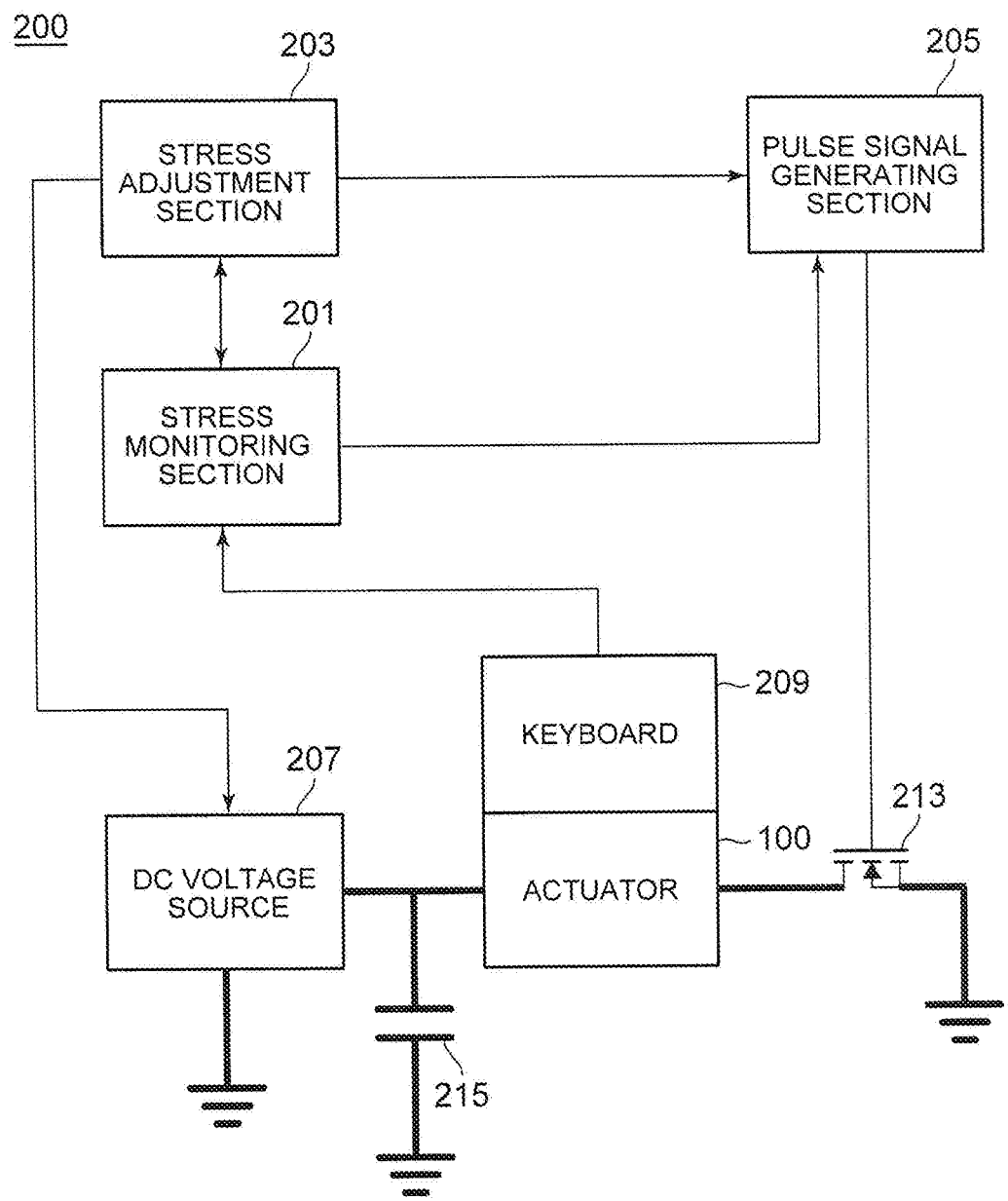
FIG. 6 is a functional block diagram of a driving system for adjusting the stress amount of the impact-driven actuator.

FIG. 6 is a functional block diagram of a driving system 200 which adjusts a stress amount of the impact-driven actuator 100. The driving system 200 includes a stress monitoring section 201, a stress adjustment section 203, a pulse signal generating section 205, a flat-type keyboard 209, a DC voltage source 207, an impact-driven actuator 100, an N-type FET 213, and a capacitor 215. The stress monitoring section 201, the stress adjustment section 203, and the pulse signal generating section 205 may include a system on chip (SoC) or a dedicated controller.

The keyboard 209 corresponds to an example of the vibrator 10 in FIGS. 1A-1B. The keyboard 209 is a keyboard of a type free from tactile as in the case of a pantograph-type keyboard at an input on the keyboard 209. The keyboard 209 includes keys typically not separated from each other and the surface of the keyboard 209 is covered with a continuous sheet. The keyboard 209 may be a software keyboard formed of a touch screen. The impact-driven actuator 100 vibrates the keyboard 209 at a timing of a key operation to give a haptic feedback. When a user performs a key operation, the impact-driven actuator 100 applies vibration to the substrate of the keyboard 209 at a timing when a make code and a break code are generated.

The keyboard 209 outputs a key event corresponding to a make code and a break code to the stress monitoring section 201 at the timing of a key operation. The stress monitoring section 201 acquires the parameter of the reference pulse voltage 21 or the parameters of the adjusted pulse voltages 35*a* to 35*d* currently set in the current pulse signal generating section 205 from the stress adjustment section 203. The stress monitoring section 201 notifies the pulse signal generating section 205 of a key event corresponding to the make code and the break code.

The stress monitoring section 201 calculates a stress amount for each predetermined monitoring period in response to an input operation on the keyboard 209 and then transmits the stress amount to the stress adjustment section 201. The stress monitoring section 201 is able to calculate a stress L, which is received by the impact-driven actuator, by using a stress function expressed by L=f(w, v, n), where w is a pulse width, v is a wave crest value, and n is the number of application times of the single pulse voltage.

A permissible stress amount Lmax is able to be calculated by Lmax=Ws×V1×ns, for example, where ns is the number of times that the reference pulse voltage 21 is applied, which is permissible during the monitoring period Ps. When n adjusted pulse voltages 35*a* having the wave crest value V2 (V2<V1) and the pulse width Ws are applied during the monitoring period Ps, the stress amount L1 is able to be calculated by L1=α1×Ws×V2×n, for example.

Moreover, when n adjusted pulse voltages 35*c* having the wave crest value V1 and the pulse width Wm (Wm<Ws) are applied during the monitoring period Ps, the stress amount L2 is able to be calculated by L2=α2×Wm×V1×n, for example. Furthermore, when n adjusted pulse voltages 35*d* having the wave crest value V2 and the pulse width Wm are applied during the monitoring period Ps, the stress amount L3 is able to be calculated by L3=α3×Wm×V2×n, for example. In the above, α1 to α3 are constants.

The stress adjustment section 203 calculates a parameter of the adjusted pulse voltage to maintain the stress amount within the range of the permissible stress amounts. The application of the adjusted pulse voltage decreases the vibration intensity. In the case where the decrease in the vibration intensity is undesirable, the stress adjustment section 203 is able to set parameters within a required range according to a difference between a permissible stress amount and an actual stress amount so that the stress amount to be adjusted is as small as possible. The stress adjustment section 203 sets parameters such as a wave crest value, a pulse width, and a duty ratio of the adjusted pulse voltage in the DC voltage source 207 and the pulse signal generating section 205.

The stress adjustment section 203 is able to instruct the pulse signal generating section 205 to stop the output of the adjusted pulse voltage at a key event corresponding to the break code low in the importance when the stress amount has increased. The stress adjustment section 203 is able to instruct the pulse signal generating section 203 to apply the reference pulse voltage in response to a make code and to apply the adjusted pulse voltage in response to a break code.

The pulse signal generating section 203 controls the FET 213 to apply the reference pulse voltage 21 or the adjusted pulse voltages 35*a* to 35*d* of the set parameters at the timing of receiving the key event. The FET 213 is a semiconductor device which performs switching control of the DC voltage, and a bipolar transistor may be used as the FET 213.

The DC voltage source 207 includes a DC-DC converter and outputs a predetermined DC voltage. When applying the adjusted pulse voltages 35*a* to 35*d*, the DC voltage source 207 adjusts an output voltage as needed by an instruction of the stress adjustment section 203. The capacitor 215 supplies the impact-driven actuator 100 with energy by charging during the off-period of the FET 213 and discharging during the on-period thereof. If the DC voltage source 207 has a sufficient capacity, the capacitor 215 may be omitted.

III. Action of Driving System

Figure 7:
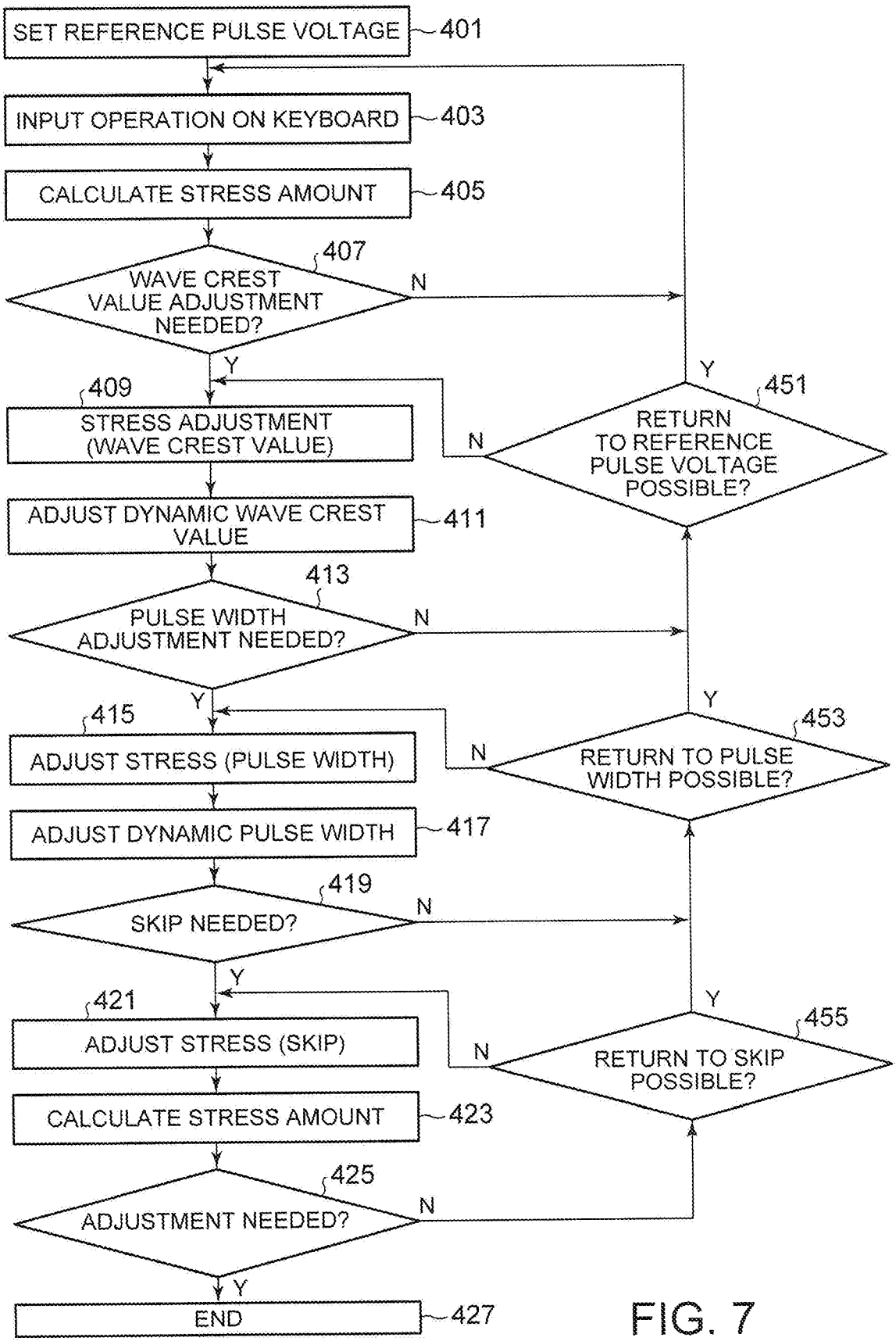
FIG. 7 is a flowchart showing a method for controlling the driving system from FIG. 6.

FIG. 7 is a flowchart illustrating a method for controlling the driving system 200. In a block 401, the stress adjustment section 203 sets a parameter of the reference pulse voltage 21 in the pulse signal generating section 205. In block 403, a user starts an input operation on the keyboard 209. In block 405, the stress monitoring section 201 outputs a stress amount calculated based on the typing speed to the stress adjustment section 203. In block 407, the stress adjustment section 203 proceeds to block 409 when determining that the stress amount exceeds a permissible value during the most recent monitoring period Ps.

If the stress amount is smaller than the permissible value, the stress adjustment section 203 returns to block 403 to maintain the parameter of the reference pulse voltage 21. In block 409, the stress adjustment section 203 starts stress adjustment so that an influence on a haptic feedback is as small as possible. In order to perform stress adjustment by applying an adjusted pulse voltage 35a with only the wave crest value lowered or an adjusted pulse voltage 35b corresponding thereto, the stress adjustment section 203 selects the wave crest value or the duty ratio according to a difference between the permissible value and the stress amount. In the following, the application of the adjusted pulse voltage 35b is also described as the application of the adjusted pulse voltage 35a.

The stress adjustment section 203 sets a wave crest value smaller than that of the reference pulse voltage 21 in the pulse signal generating section 205. The adjusted pulse voltage 35a adjusted at the timing of the key event is applied to the impact-driven actuator 100, and therefore the stress amount decreases unless the typing speed changes. In block 411, the stress monitoring section 201 calculates the stress amount for a subsequent key operation and outputs the stress amount to the stress adjustment section 203. The stress adjustment section 203 adjusts the wave crest value within a range of smaller values than the wave crest value of the reference pulse voltage 21 according to the increase or decrease in the stress amount.

Although the stress adjustment section 203 is able to gradually decrease the wave crest value according to the stress amount, a decrease of the wave crest value up to a predetermined minimum value lowers the vibration, by which a predetermined haptic feedback cannot be given. If determining that the stress amount exceeds the permissible value even if the wave crest value is adjusted to the minimum value during the most recent monitoring period Ps in block 413, the stress adjustment section 203 proceeds to block 415 to adjust the stress with a pulse width.

If the stress amount is smaller than the permissible value, the stress adjustment section 203 proceeds to block 451 to determine whether or not it is possible to return to the reference pulse voltage 21. If it is possible, the control proceeds to block 403, where the pulse signal generating section 205 applies the reference pulse voltage 21 to the SMA 101. Otherwise, the control proceeds to block 409, where the stress adjustment section 203 maintains the parameter of the adjusted pulse voltage 35a. In block 415, the stress adjustment section 203 sets the parameter of the adjusted pulse voltage 35c with the pulse width lowered in the pulse signal generating section 205. In block 417, the stress monitoring section 201 calculates the stress amount for a further subsequent key operation and outputs the stress amount to the stress adjustment section 203.

The stress adjustment section 203 adjusts the pulse width Wm within a range of smaller values than the pulse width Ws of the reference pulse voltage 21 according to an increase or decrease in the stress amount. The stress adjustment section 203 is able to gradually decrease the pulse width according to the stress amount. If the pulse width is reduced to a predetermined value, however, a predetermined haptic feedback cannot be given. If determining that the stress amount exceeds the permissible value during the most recent monitoring period Ps in block 419, the stress adjustment section 203 proceeds to block 421 to adjust the stress.

If the stress amount is smaller than the permissible stress amount, the stress adjustment section 203 proceeds to block 453 to determine whether or not it is possible to return to the adjusted pulse voltage 35a. If it is possible, the stress adjustment section 203 proceeds to block 451. Otherwise, the stress adjustment section 203 proceeds to block 415 to maintain the parameter of the adjusted pulse voltage 35c. In block 421, the stress adjustment section 203 instructs the pulse signal generating section 205 to stop the application of the adjusted pulse voltage 35c corresponding to the break code.

In a haptic feedback for a keyboard operation, vibration generated at the time of key depression normally provides a good tactile response. Accordingly, an influence on the haptic feedback is reduced by skipping the adjusted pulse voltage 35c corresponding to the break code. In block 423, the stress monitoring section 201 calculates the stress amount and outputs the result thereof to the stress adjustment section 203. In block 425, the stress adjustment section 203 stops the stress adjustment of the present invention in block 427 if determining that the stress amount exceeds the permissible value during the most recent monitoring period Ps.

If the stress amount is smaller than the permissible value, the control proceeds to block 455, where the stress adjustment section 203 determines whether or not it is possible to apply the adjusted pulse voltage 35c corresponding to the break code which has been stopped until then. If it is possible, the control proceeds to block 453. Otherwise, the control proceeds to block 421, where the adjusted pulse voltage 35c skipped for the break code is maintained.

The above procedure has been described by giving an example of the present invention and does not intend to limit the scope of the present invention. For example, all of the steps of the blocks 409, 415, and 421 do not need to be performed and the sequence of the steps may be altered. Although an example of applying the adjusted pulse voltages 35a and 35c has been illustrated, the adjusted pulse voltage 35d (FIG. 4) whose wave crest value and pulse width are both adjusted may be applied, instead of or in addition to the illustrated example.

Furthermore, the step of block 409 or block 415 may be combined with the step of block 421 to apply single pulse voltages different between the make code and the break code. For example, when the stress amount has increased, the application of the reference pulse voltage 21 corresponding to the make code relatively important is maintained, while the adjusted pulse voltages 35a to 35d may be applied or skipped responding only to the break code. The present invention is not only applicable to the haptic feedback for the keyboard, but also applicable to all aspects of the impact-driven actuator which performs a random and repetitive action.

As has been described, the present invention provides an improved method and apparatus for driving an actuator.

While the invention has been particularly shown and described with reference to a preferred embodiment, it will be understood by those skilled in the art that various changes in form and detail may be made therein without departing from the spirit and scope of the invention.

What is claimed is:

1. A method comprising:
in response to an input event, applying a predetermined pulse voltage to an actuator, wherein said predetermined pulse voltage is a reference pulse voltage that causes said actuator to generate a predetermined vibration intensity;
monitoring a stress amount of said actuator that acts as a response to said input event; and
in response to said stress amount reaches a predetermined value, applying an adjusted pulse voltage having parameters adjusted to said actuator response to said input event.

2. The method of claim 1, wherein said stress amount includes a wave crest value and a pulse width of said pulse voltage and the number of pulse voltages applied to said actuator during a predetermined period of time.

3. The method of claim 1, wherein said adjusted pulse voltage is lower than said predetermined pulse voltage only in said wave crest value.

4. The method of claim 1, wherein said adjusted pulse voltage is lower than said predetermined pulse voltage only in said pulse width.

5. The method of claim 1, wherein said adjusted pulse voltage is lower than said predetermined pulse voltage in said wave crest value and said pulse width.

6. The method of claim 1, wherein said adjusted pulse voltage is a pseudo single pulse voltage having sub-pulse voltages.

7. The method of claim 1, wherein said applying said adjusted pulse voltage includes skipping an application of said adjusted pulse voltage corresponding to said predetermined input event.

8. A method comprising:
activating an actuator having a shape memory alloy by applying a predetermined pulse voltage at a time when a keyboard generates a key code;
monitoring said number of key inputs on said keyboard for a predetermined period of time; and
activating said actuator by an adjusted pulse voltage whose parameter is adjusted when said number of key inputs reaches a predetermined value.

9. The method of claim 8, wherein said key code includes a make code and a break code.

10. The method of claim 9, wherein said method further includes activating said actuator by said predetermined pulse voltage corresponding to said make code and said adjusted pulse voltage corresponding to said break code.

11. The method of claim 8, wherein said method further includes stopping said action of said actuator corresponding to said break code.

12. An apparatus comprising:
an actuator activated by a pulse voltage via a shape memory alloy;
a vibrator vibrates by said action of said actuator;
an action event generating unit generates an action event, wherein said action event includes first and second types;
a stress monitoring unit determines a stress amount of said actuator based on a parameter of said pulse voltage and said action event; and
a stress adjustment unit changes said parameter when said stress amount reaches a predetermined value, and skips said generation of said pulse voltage corresponding to said second type of action event.

13. The apparatus of claim 12, wherein said stress adjustment unit sets said parameter different between said first type action event and said second type action event.

14. The apparatus of claim 12, wherein said actuator is an impact-driven actuator.

* * * * *